United States Patent
Nelson

(10) Patent No.: US 8,104,046 B2
(45) Date of Patent: Jan. 24, 2012

(54) POLLING ADAPTER PROVIDING HIGH PERFORMANCE EVENT DELIVERY

(75) Inventor: Travis E. Nelson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1034 days.

(21) Appl. No.: 11/842,842

(22) Filed: Aug. 21, 2007

(65) Prior Publication Data

US 2009/0055827 A1 Feb. 26, 2009

(51) Int. Cl.
*G06F 9/54* (2006.01)
*G06F 15/173* (2006.01)

(52) U.S. Cl. .......................... 719/318; 709/224

(58) Field of Classification Search .............. 719/318
See application file for complete search history.

(56) References Cited

U.S. PATENT DOCUMENTS

| | | | |
|---|---|---|---|
| 6,618,373 B1 | 9/2003 | Subramaniam | 370/390 |
| 6,839,748 B1 | 1/2005 | Allavarpu et al. | 709/223 |
| 7,636,873 B2 | 12/2009 | Lacombe et al. | |
| 7,831,693 B2 * | 11/2010 | Lai | 709/220 |
| 2004/0078495 A1 | 4/2004 | Mousseau et al. | 710/1 |
| 2004/0243663 A1 | 12/2004 | Johanson et al. | 709/200 |
| 2005/0038801 A1 | 2/2005 | Colrain et al. | 707/100 |
| 2005/0166187 A1* | 7/2005 | Das et al. | 717/136 |
| 2005/0262183 A1 | 11/2005 | Colrain et al. | 709/200 |
| 2006/0126599 A1 | 6/2006 | Tarn | 370/352 |
| 2006/0200829 A1* | 9/2006 | Astl et al. | 719/314 |
| 2006/0282524 A1* | 12/2006 | Lacombe et al. | 709/224 |
| 2007/0005757 A1 | 1/2007 | Finger et al. | 709/224 |
| 2007/0083807 A1 | 4/2007 | Shaudys et al. | 715/513 |

OTHER PUBLICATIONS

Jonathan Lemon "Kqueue: A generic and scalable event notification facilty", 2001.*
Nikolai and Erez Zadok "Kqueue prototype implemenation for Linux.", May 2002.*

* cited by examiner

*Primary Examiner* — Lechi Truong
*Assistant Examiner* — Abdou Seye
(74) *Attorney, Agent, or Firm* — Kunzler Needham Massey & Thorpe

(57) ABSTRACT

An apparatus and method for improving event delivery efficiency in a polling adapter system is configured to poll an enterprise information system (EIS) to obtain a list of events occurring in the EIS. Each event may be associated with an object key. These events may then be allocated to multiple delivery lists wherein events associated with the same object key are allocated to the same delivery list. Multiple delivery threads may then be generated, with each delivery thread being associated with a delivery list. Each delivery thread is configured to retrieve, from the EIS, events listed in the delivery list associated with the thread and deliver the events to a client.

2 Claims, 3 Drawing Sheets

POLLING ADAPTER PROVIDING HIGH PERFORMANCE EVENT DELIVERY

BACKGROUND OF THE INVENTION

1. Field of the Invention

This invention relates to enterprise application integration and more particularly to apparatus and methods for improving event delivery performance in polling adapters.

2. Description of the Related Art

Adapters allow business events to flow from an Enterprise Information System (EIS) to a listening client such as a business process or other application. The Java 2 Enterprise Edition (J2EE) standard defines a standard approach to building these adapters. This approach is outlined in the J2EE Connector Architecture (JCA) specification.

The flow of information from an EIS to a client system is commonly referred to as "inbound communication." Often, the EIS is not configured to communicate directly with the adapter. As a result, the adapter may be configured to periodically poll the EIS for new information. In many cases, a "trigger" may be put in place in the EIS system, which may be configured to write "event records" into an "event table" when data has changed in the EIS. The adapter may then poll this event table to obtain a list of changed objects, including the types of objects and their keys. The adapter may then use this information to retrieve the entire event from the EIS system, send it to the client system, and delete the event from the event table, often within the context of a transaction.

A client system may often require that events be received and processed in a certain order. Specifically, for a given object key, events related to that object key may need to be received and processed in sequence. This may be important in data synchronization scenarios because if, for example, a CREATE operation for an object occurred prior to an UPDATE operation on the same object in an EIS, the CREATE operation would also need to occur prior to the UPDATE operation in the downstream client system. If the two operations were reversed, the synchronization process between the EIS and client system would fail.

An adapter will ideally deliver events to a client as fast as possible, while ensuring that events for the same object are processed in the correct order. Some intelligence in the adapter is necessary to make this happen. In the past, many polling adapters had two modes of operation: ORDERED and UNORDERED. The ORDERED mode would address the ordering requirement by placing all polling or event delivery logic on a single thread of execution. By contrast, the UNORDERED mode would utilize multiple threads of execution (up to one per event in the poll cycle) but could not guarantee a specific order. Additionally, because only one connection to the EIS was defined, the multiple threads of execution in UNORDERED mode would contend for the connection. To prevent some of this contention, the "delete" operation in the event table would be delayed until all delivery threads finished executing.

In view of the foregoing, what is needed is a polling adapter that can guarantee the related events are delivered in order, while allowing unrelated events to be delivered in any order. Ideally, such a polling adapter could accomplish these goals while delivering events to a client in a fast and efficient manner.

SUMMARY OF THE INVENTION

The present invention has been developed in response to the present state of the art, and in particular, in response to the problems and needs in the art that have not yet been fully solved by currently available polling adapters. Accordingly, the present invention has been developed to provide a polling adapter that can deliver related events in order, deliver unrelated events in any order, while still ensuring that events are delivered to a client system in a fast and efficient manner.

In a first aspect of the invention, a method for improving event delivery efficiency in a polling adapter may include polling an enterprise information system (EIS) to obtain a list of events occurring in the EIS. Each event may be associated with an object key. These events may be allocated to multiple delivery lists wherein events associated with the same object key are allocated to the same delivery list. The method may then include generating multiple delivery threads, wherein each delivery thread is associated with a delivery list. Each delivery thread is configured to retrieve, from the EIS, events listed in the delivery list and deliver the events to a client system.

In selected embodiments, the method may further include designating an order for each event in a delivery list that is associated with the same object key. The method may further include executing each delivery thread over a separate connection with the EIS.

In another aspect of the invention, an apparatus for improving event delivery efficiency in a polling adapter may include a polling module to poll an enterprise information system (EIS) in order to obtain a list of events occurring in the EIS. Each event may have an object key associated therewith. A delivery list generation module may be provided to allocate the events to multiple delivery lists, wherein events associated with the same object key are allocated to the same delivery list. A thread generation module may be provided to generate multiple delivery threads, wherein each delivery thread is associated with a delivery list. Each delivery thread is configured to retrieve, from the EIS, events listed in the delivery list and deliver the events to a client.

In selected embodiments, the apparatus may further include a sequencing module to designate an order for executing each event associated with the same object key. The apparatus may also include a connection pool module to provide multiple connections to the EIS. This may allow threads to be executed concurrently over separate connections with the EIS.

The present invention provides an improved polling adapter that provides high performance event delivery. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings in which.

DETAILED DESCRIPTION OF THE INVENTION

Figure 1:
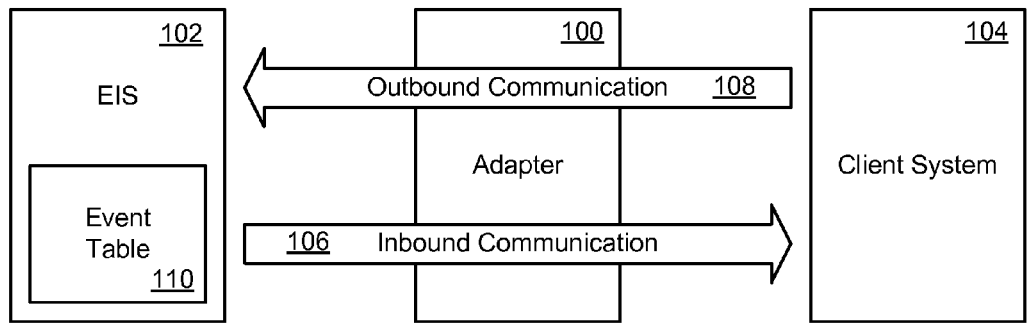
FIG. 1 is a high level block diagram showing the relationship between an EIS, client system, and adapter in accordance with the invention.

It will be readily understood that the components of the present invention, as generally described and illustrated in the Figures herein, may be arranged and designed in a wide variety of different configurations. Thus, the following more detailed description of the embodiments of the apparatus and methods of the present invention, as represented in the Figures, is not intended to limit the scope of the invention, as claimed, but is merely representative of selected embodiments of the invention.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose of the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, specific details may be provided, such as examples of programming, software modules, user selections, or the like, to provide a thorough understanding of embodiments of the invention. One skilled in the relevant art will recognize, however, that the invention can be practiced without one or more of the specific details, or with other methods or components. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, an adapter 100 in accordance with the invention may enable business events to flow from an Enterprise Information System (EIS) 102 to a listening client 104 such as a business process or application. The flow of information from the EIS 102 to the client system 104 may be referred to as "inbound communication" 106 whereas the flow of information from the client system 104 to the EIS 102 may be referred to as "outbound communication" 108. As mentioned, a trigger may be put in place in the EIS 102 to write event records to an event table 110 when data has changed in the EIS 102. The adapter 100 may periodically poll the EIS 102 for new information in the event table 110.

Figure 2:
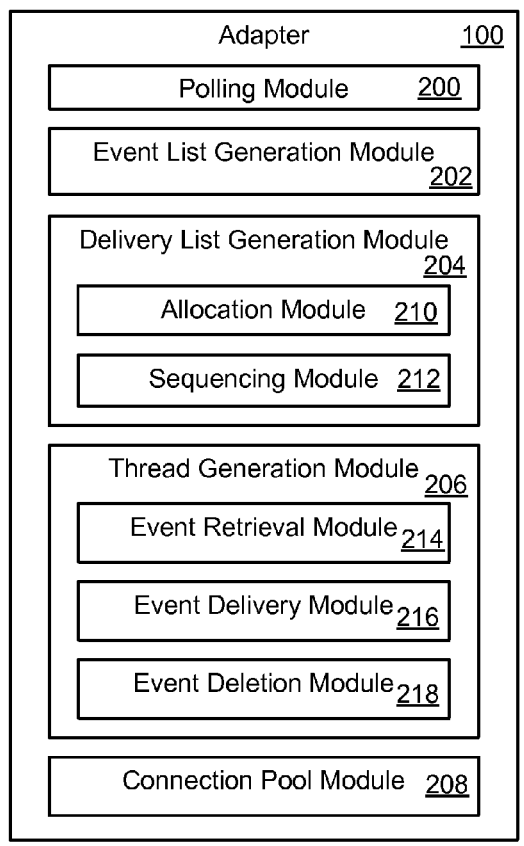
FIG. 2 is a high level block diagram of one embodiment of an adapter in accordance with the invention.

Referring to FIG. 2, in selected embodiments, an improved adapter 100, or apparatus 100, in accordance with the invention may be configured to support a new mode of operation (e.g., ORDERED_BY_KEY) not supported by conventional adapters. This mode may be used to deliver related events in order, unrelated events in any order, while still providing efficient event delivery to a client system 104. Such an adapter 100 may, in selected embodiments, include a polling module 200, an event list generation module 202, a delivery list generation module 204, a thread generation module 206, and a connection pool module 208.

A polling module 200 in accordance with the invention may be configured to periodically poll the EIS event table 110 for new events which have occurred since the last poll cycle. The event table 110 may store a status associated with each event, and this status may indicate whether an event has been previously delivered to a client system 104. Using this status information, an event list generation module 202 may create a list of new events that have occurred since the last poll cycle and that need to be delivered to a client system 104. In selected embodiments, these events may reference objects changed in the EIS 102, as well as the object types and keys.

Once the event list is generated, a delivery list generation module 204 may generate multiple delivery lists and assign the events to one of the delivery lists. An allocation module 210 may assign events associated with same object key to the same delivery list and ensure that roughly the same number of events is assigned to each delivery list. The logic needed to accomplish this task will be explained in more detail in association with FIG. 4. A sequencing module 212 may order the events within each delivery list so that events associated with the same object key are delivered to the client system 104 in the correct order. The allocation module 210 and sequencing module 212 together may ensure that related events are processed in order, while allowing unrelated events to be processed in any order.

A thread generation module 206 may generate a delivery thread, for execution by the adapter 100, associated with each delivery list. For each thread, an event retrieval module 214 may retrieve the full event from the EIS 102 for each event in the delivery list associated with the thread. An event delivery module 216 may deliver each event in the delivery list to the client system 104 (possibly in a transaction) in the order specified in the delivery list. Once delivery is complete, an event deletion module 218 may delete the events from the event table 110.

Figure 3:
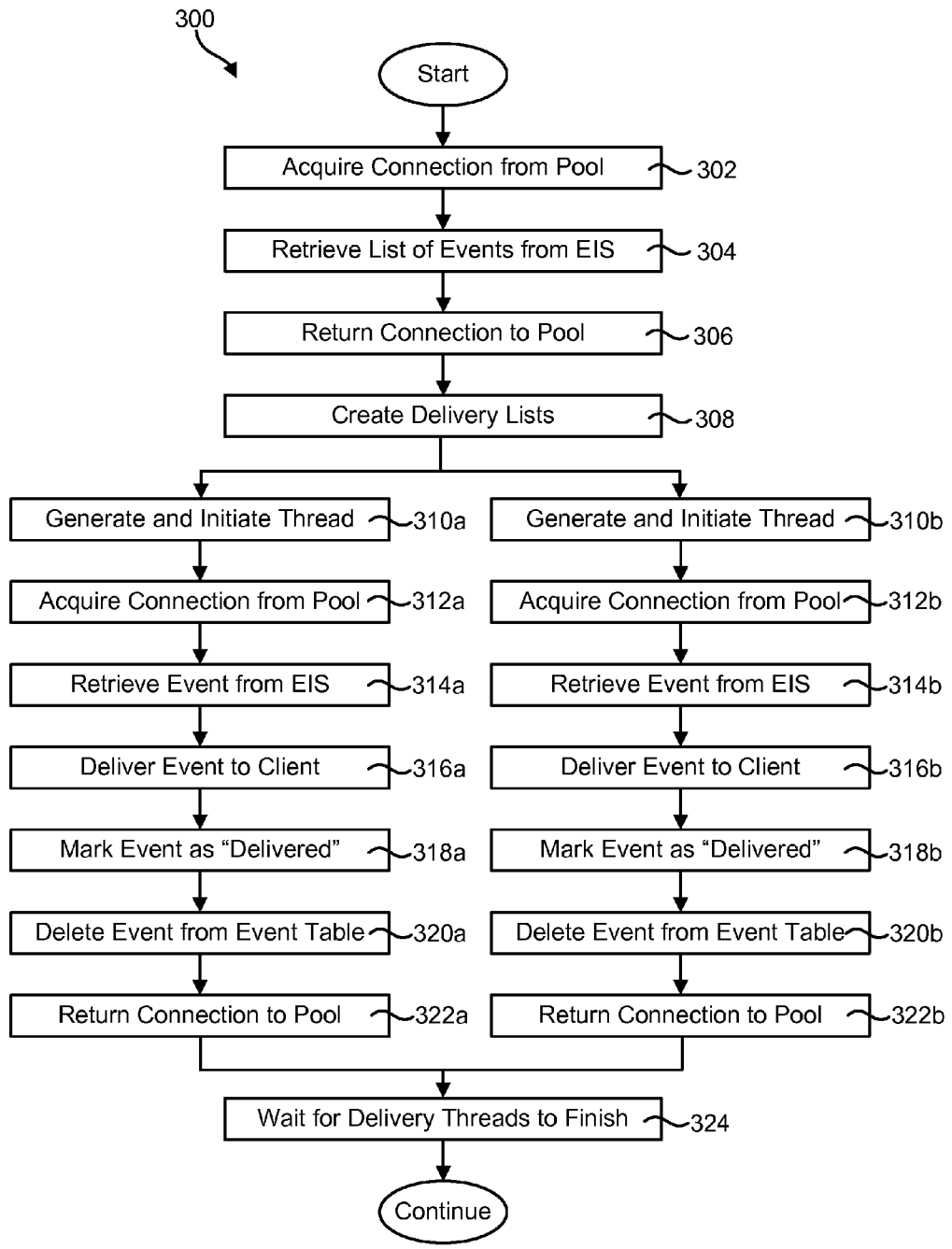
FIG. 3 is a flow chart illustrating one embodiment of a method implementable by the adapter of FIG. 2.

A connection pool module 208 may be used to provide multiple connections to the EIS 102. Ideally, each thread generated by the thread generation module 206 will be executed over a different connection with the EIS 102. This allows multiple threads to execute concurrently, reduces contention for connections, and allows events to be delivered to a client system 104 in a more efficient manner. In selected embodiments, the delivery list generation module 204 is configured to generate only as many delivery lists as there are available connections, ensuring that each deliver list, and thus each thread, utilizes a different connection. ensure Referring to FIG. 3, one embodiment of a method 300 implementable by the adapter 100 is illustrated. As shown, after recovering from any previous failures (e.g., failed transactions, etc.), a method 300 may initially acquire 302 a connection from the connection pool and retrieve 304, over the connection, a list of events from the EIS 102. The connection may then be returned 306 to the connection pool. Once the list of events is obtained, multiple delivery lists may be created 308. Ideally, one delivery list is created for each available connection in the connection pool, with each delivery list containing a roughly equal number of events. One example of a method for creating and allocating events to the delivery lists will be described in association with FIG. 4.

Once the delivery lists have been generated, a delivery thread may be generated 310 and initiated 310 for each delivery list. At this point in the method 300, steps 310-322 may execute for each thread, as indicated by the diverging paths of the method 300. As shown, each thread may acquire 312 a connection from the connection pool. For each event in a thread's delivery list, the thread may retrieve 314 the full event (i.e., object) from the EIS 102, deliver 316 the event to the client system 104, mark 318 the event as "delivered" in the event table 110, and delete 320 the event from the event table 110. Performance may be improved by allowing event table deletes to occur on a delivery thread. Furthermore, this may be useful in establishing a "threadsafe" connection by allowing the adapter 100 to delete events on the delivery thread even when there is no connection pool. This may be useful for adapters where the concept of a "connection" to the event table 110 is not applicable, or there is the possibility of only one connection, and it can handle calls on multiple threads.

Each of the steps 314-320 may be performed for each event in the thread's delivery list. The thread may then return 322 the connection to the connection pool and wait 324, at a synchronization point 324, for other delivery threads to finish executing. After all threads have finished executing, the method 300 may wait a specified period before beginning the next poll cycle.

Figure 4:
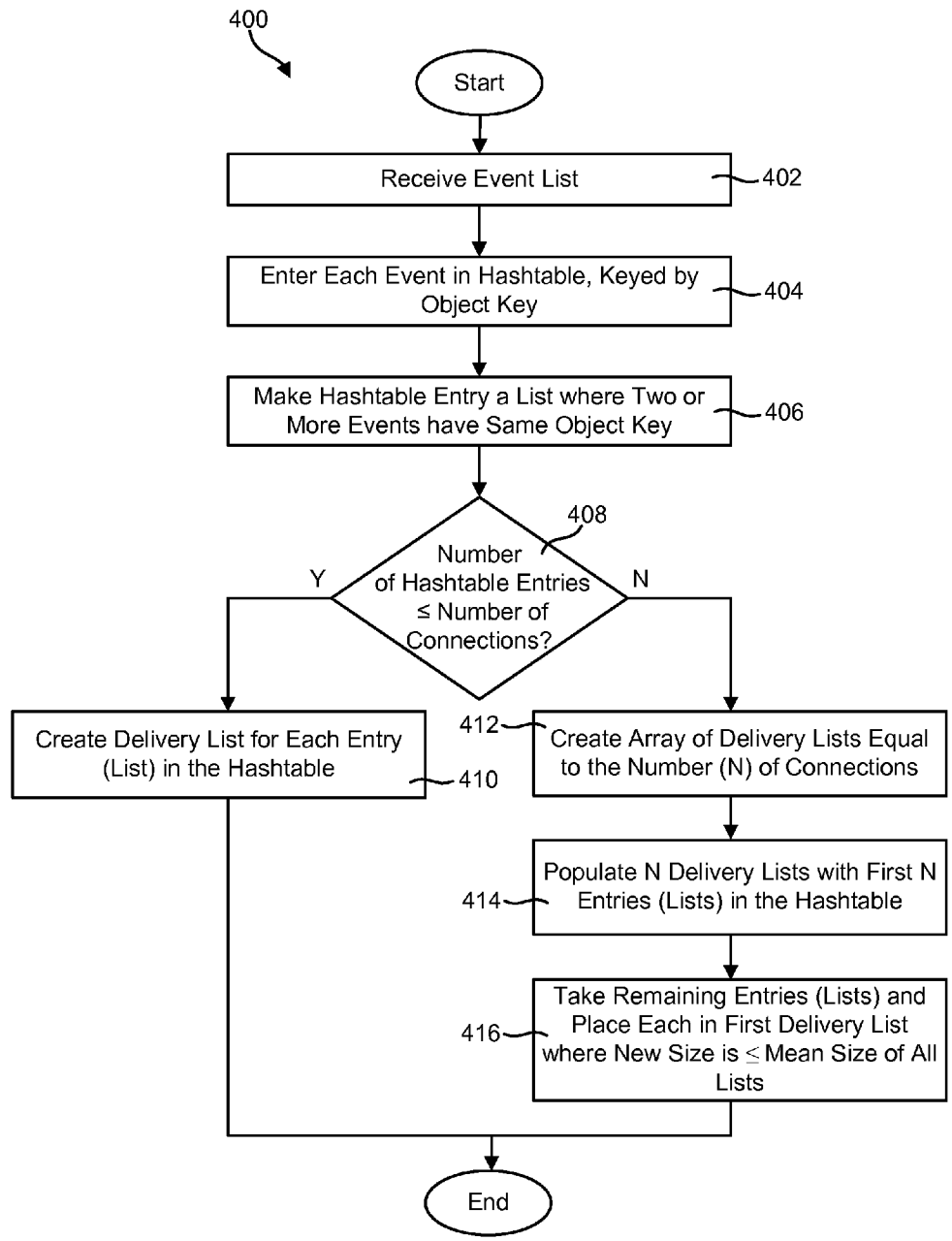
FIG. 4 is a flow chart illustrating one embodiment of a method for generating delivery lists and allocating events thereto.

Referring to FIG. 4, in one embodiment, a method 400 for creating and populating the delivery lists may include initially receiving 402 an event list and entering 404 each event in the event list into a hashtable, keyed by object key, to be used for later retrieval. If multiple events have the same object key, then the hashtable entry may be converted 406 to a list containing all events with the same object key.

If, at a decision step 408, the number of hashtable entries (or lists) is less than or equal to the number of connections available, then the method 400 may create 410 a delivery list for each entry (or list) in the hashtable. Thus, a delivery list will be created for each object key in the hashtable. Events having the same object key will be assigned to the same delivery list.

Conversely, if the number of hashtable entries (or lists) is greater than the number of connections that are available, then the hashtable entries (or lists) may be consolidated to ensure that the number of delivery lists does not exceed the number of available connections. In this case, the method 400 may create 412 an array of delivery lists equal to the number ("N") of available connections. The method 400 may then populate 414 the delivery lists with the first "N" entries (or lists) of events in the hashtable. Because the number of entries (lists) is greater than the number of delivery lists, the remaining entries (lists) may be distributed among the delivery lists in a way that distributes the work as evenly as possible. In general, the shortest delivery lists should receive the remaining entries (lists) to ensure that the delivery lists contain a roughly equal number of entries, or are equalized as much as possible.

In one embodiment, if the number of hashtable entries (or lists) is greater than the number of connections available, the method may include taking 416 the remaining entries and placing each entry in the delivery list where the new delivery list size will be less than the mean size of all the delivery lists. In this way, the length of the delivery lists will be equalized as much as possible. Because the threads (each containing a delivery list) may be executed concurrently over separate connections with the EIS 102, this will distribute the load roughly evenly across each thread (and thus across each connection) to efficiently utilize resources.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for improving event delivery efficiency in a polling adapter, the method comprising:

polling, by use of a processor, an enterprise information system (EIS) event table to obtain a list of events occurring in the EIS, each event being associated with an object key;

entering each event into a hash table with each event keyed by the event's object key, wherein events sharing a first object key are organized in a first event list within the hash table;

creating an array of delivery lists equal to a number of connections with the EIS if a number of hash table entries is not less than the number of connections else creating a delivery list for each entry in the hash table;

allocating the events from the hash table to the array of delivery lists, wherein the events of the first event list are allocated to a first delivery list and ordered in a designated order;

placing remaining entries and lists of the hash table in the first delivery list if the new first delivery list size is less than a mean size of all the delivery lists and if the number of hash table entries is not less than the number of connections;

generating a plurality of delivery threads, each delivery thread being associated with a delivery list, each delivery thread retrieve, from the EIS, events listed in the delivery list and delivering the events to a client over a separate connection;

deleting a second event in a delivery thread in response to a delete of the second event in the event table; and executing each delivery thread concurrently.

2. An apparatus for improving event delivery efficiency in a polling adapter, the apparatus comprising;
- a storage device storing executable code;
- a processor executing the executable code, the executable code comprising:
- a polling module polling an enterprise information system (EIS) event table to obtain a list of events occurring in the EIS, each event being associated with an object key;
- an event generation module entering each event into a hash table with each event keyed by the event's object key, wherein events sharing a first object key are organized in a first event list within the hash table;
- a delivery list generation module creating an array of delivery lists equal to a number of connections with the EIS if a number of hash table entries is not less than the number of connections else creating a delivery list for each entry in the hash table and allocating the events from the hash table to the array of delivery lists, wherein the events of the first event list are allocated to a first delivery list and ordered in a designated order, and placing remaining entries and lists of the hash table in the first delivery list if the new first delivery list size is less than a mean size of all the delivery lists and if the number of hash table entries is not less than the number of connections;
- a thread generation module generate a plurality of delivery threads, each delivery thread being associated with a delivery list, each delivery thread to retrieving, from the EIS, events listed in the delivery list, delivering the events to a client over a separate connection, and deleting a second event in a delivery thread in response to a delete of the second event in the event table; and
- the thread generation module further executing each delivery thread concurrently.

* * * * *